Dec. 8, 1970 — W. C. CHRISTINE ET AL — 3,545,173

CONTAINER LID SPOT SEALER

Filed Oct. 30, 1968 — 3 Sheets-Sheet 1

INVENTOR
WILLIAM C. CHRISTINE
JOSEPH E. PIERCE

BY Sherman Levy
ATTORNEY

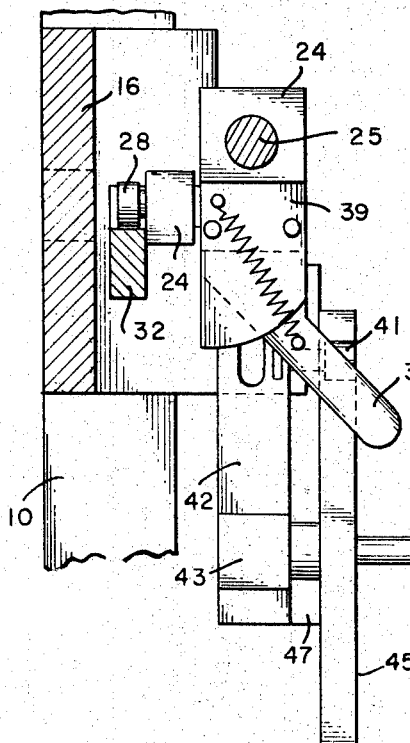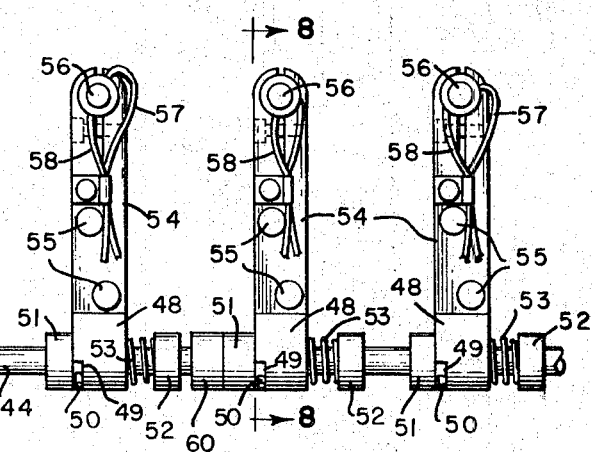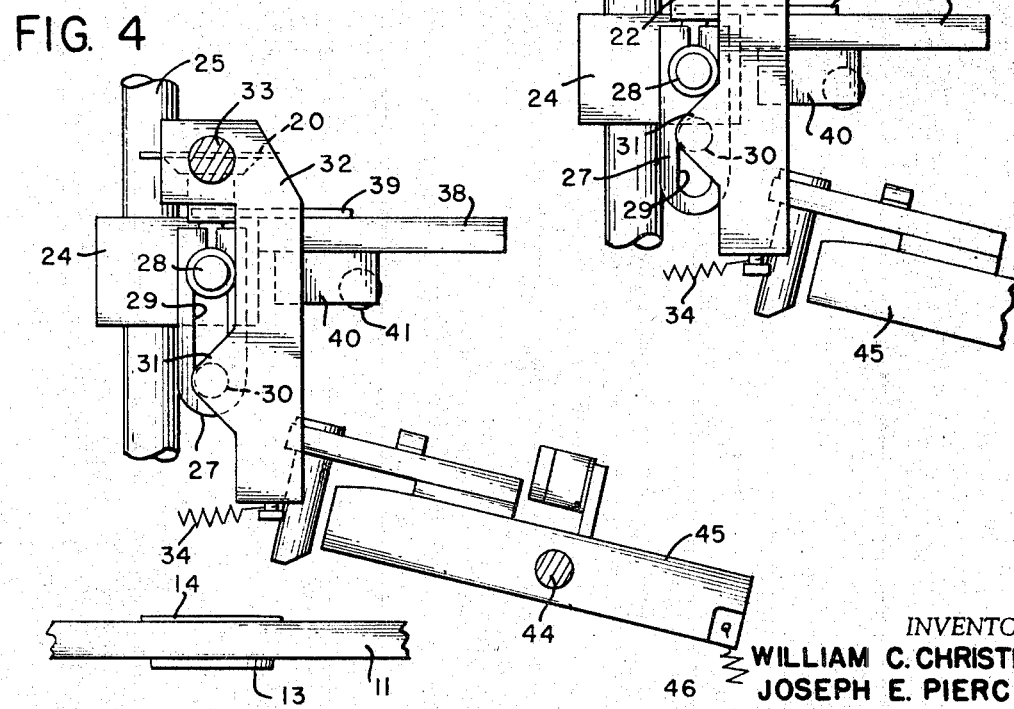

Dec. 8, 1970  W. C. CHRISTINE ET AL  3,545,173
CONTAINER LID SPOT SEALER
Filed Oct. 30, 1968  3 Sheets-Sheet 3
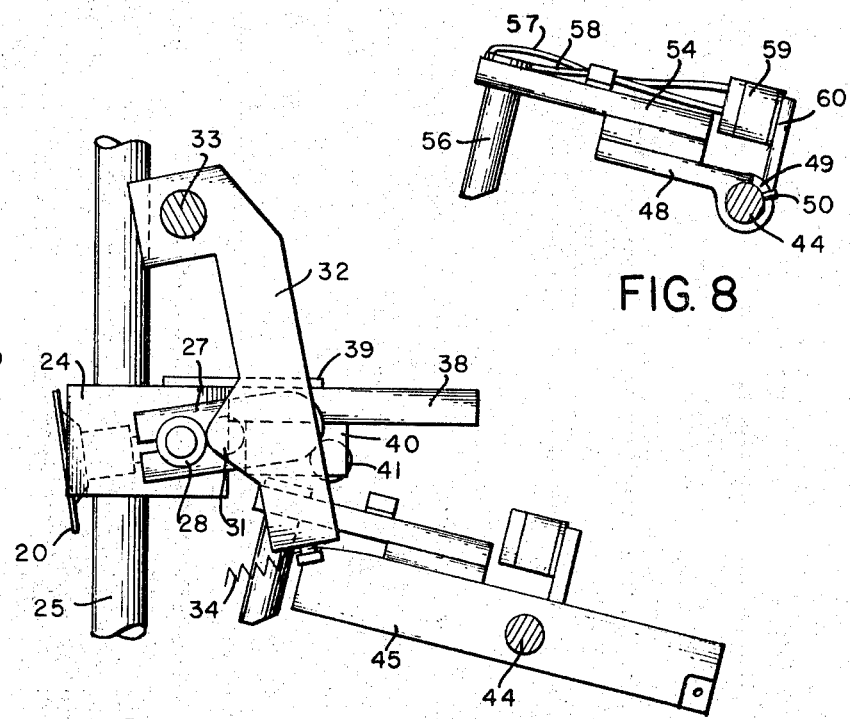
FIG. 8
FIG. 6
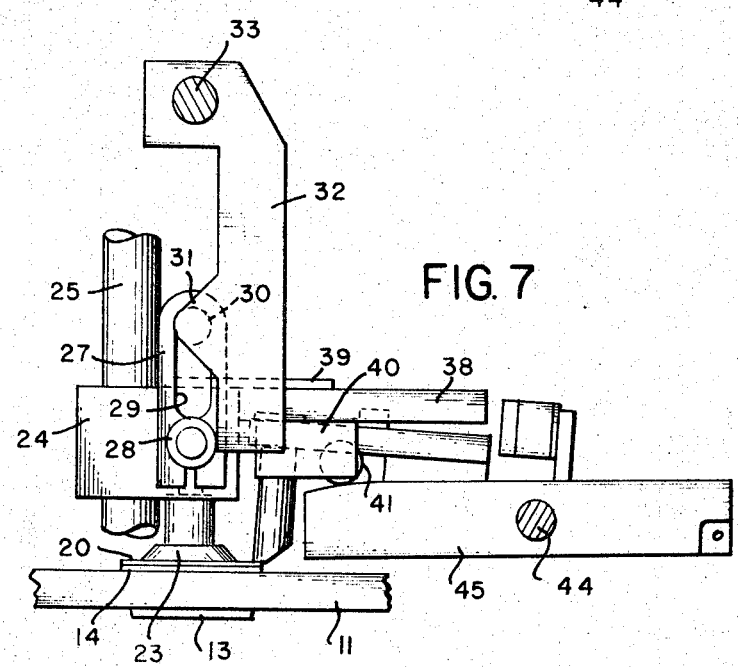
FIG. 7
INVENTOR
WILLIAM C. CHRISTINE
JOSEPH E. PIERCE
BY Sherman Levy
ATTORNEY United States Patent Office 3,545,173
Patented Dec. 8, 1970

3,545,173
CONTAINER LID SPOT SEALER
William C. Christine, Catasauqua, and Joseph E. Pierce, Allentown, Pa., assignors to A.E.I. Corporation, Bethlehem, Pa., a corporation of Delaware
Filed Oct. 30, 1968, Ser. No. 771,895
Int. Cl. B65b 7/28
U.S. Cl. 53—307
4 Claims

ABSTRACT OF THE DISCLOSURE

A lid spot sealing apparatus having means for removing a lid from a supply, placing such lid on a container and sealing the lid to the container in one spot to retain the lid and container in fixed position relative to each other until permanently sealed.

BACKGROUND OF THE INVENTION

Field of the invention

This invention relates generally to food or other article packaging machinery and relates particularly to apparatus for placing a lid on a container and sealing such lid thereon.

Description of the prior art

Many efforts have been made to apply a lid to a container in the packaging industry, however most of these efforts have been directed toward metal or other containers in which the lid has been placed in position and then sealed by crimping, rolling or the like so that the container will be fluid tight. With the advent of the foil and plastic containers it became necessary to seal the tops to the containers by means of adhesives of various kind or by the application of heat.

Applicants have been in this industry for many years and have tried many ways of placing the tops on the containers, however normally in a production line operation it is necessary to move the container from the top applying station to a sealing station and during the move the tops have become displaced from the containers. In applications where an adhesive has been used the adhesive has not always been applied evenly and some of the adhesive has been inadvertently added to the material within the container. Some efforts have been made to maintain the tops and containers in assembled relation by means of a vacuum, however this method has required highly sophisticated machinery which was expensive to purchase and maintain.

SUMMARY OF THE INVENTION

The present invention is a spot sealer associated with apparatus for removing lids one at a time from a supply and which places such lids on a container after the container has been filled with any desired material such as a food product in granulated or powdered form. When the lid has been placed on the container, the spot sealer is moved into engagement with the lid to apply heat and cause localized fusing of the materials of the lid and container. The movement of the sealer into engagement with the lid is caused by the apparatus which places the lid on the container and spring means is provided for returning the sealer to inactive position after the lid is tacked or otherwise sealed on the container.

BRIEF DEECRIPTION OF THE DRAWINGS

Figure 1:
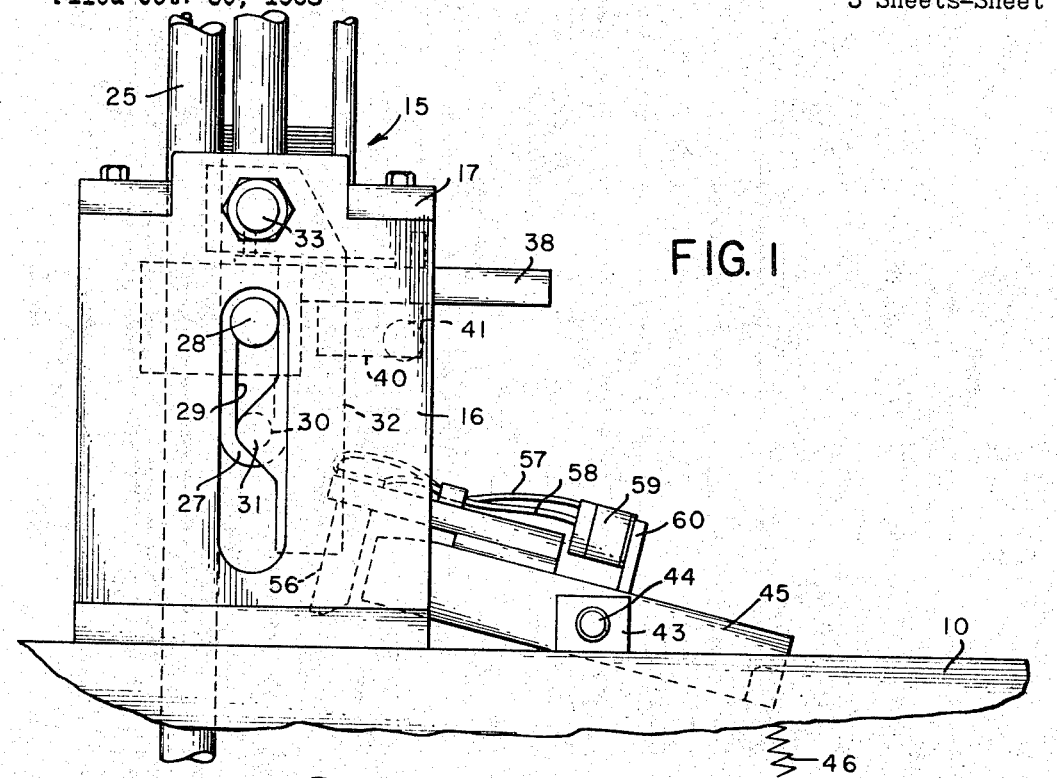
Figure 2:
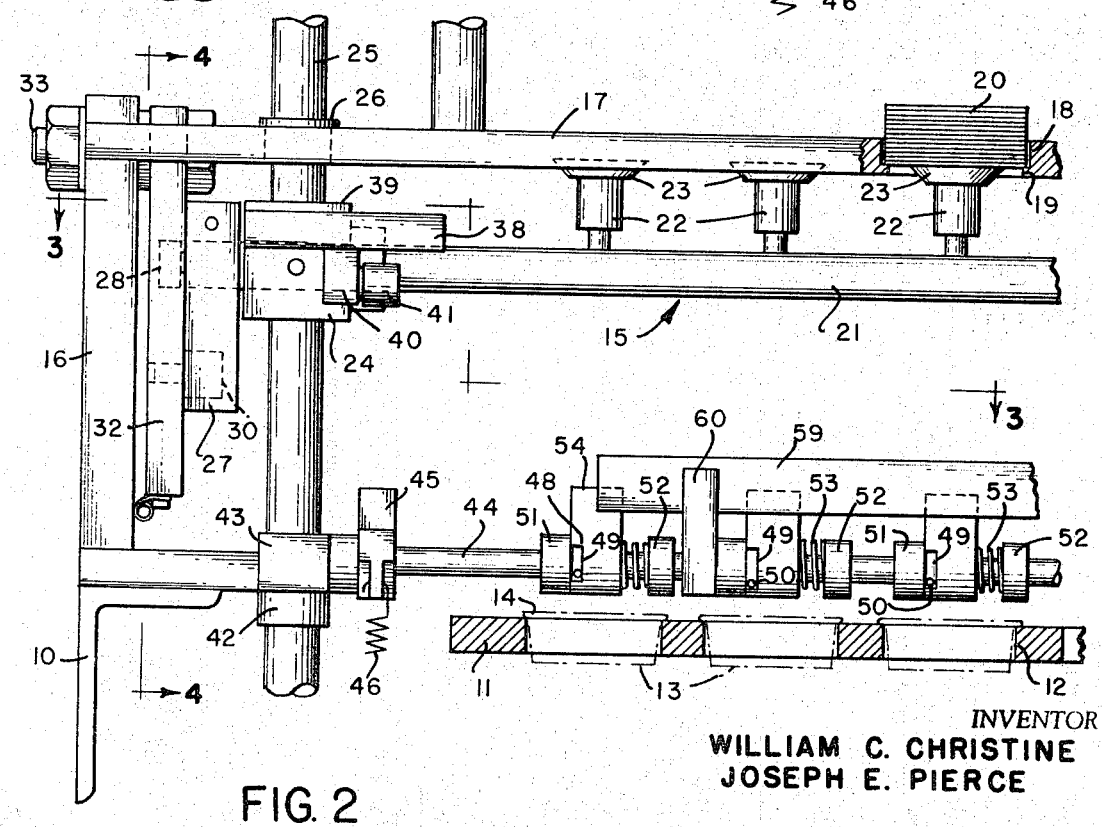

FIG. 1 is a side elevation illustrating one application of the invention.
FIG. 2 is a fragmentary front elevation thereof.
FIG. 3 is a section on the line 3—3 of FIG. 2.
FIG. 4 is a section on the line 4—4 of FIG. 2.
FIG. 5 is a section similar to FIG. 4 illustrating the first step in the placing of a top on a container.
FIG. 6 is a section similar to FIG. 4 illustrating an intermediate step.
FIG. 7 is a view similar to FIG. 4 of the last step in which the lid is in position on the container and the sealer is in operative position.
FIG. 8 is a section on the line 8—8 of FIG. 3.

DESCRIPTION OF THE PREFERRED EMBODIMENTS

With continued reference to the drawings a packaging machine for food or other material is provided having a frame 10 with portions located on both sides of the machine. An endless conveyor having a series of flights 11 is disposed between the upper portions of the frame 10 and each of such flights has a plurality of openings 12 for the reception of cups or other containers 13 having outwardly turned flanges 14. The cups preferably are constructed of foil having a thin film of plastic or other heat treatable material thereon to preserve the flavor of the food product or other material which is discharged into the cups in any normal manner. The structure thus far is conventional in the industry and forms no part of the present invention.

After the material has been deposited into the cups, such cups are moved by intermittent steps to a lid dispensing mechanism 15. The lid dispensing mechanism includes a pair of upstanding side members 16, one mounted on each side of the frame 10, and being connected by a platform 17. The platform 17 includes a plurality of openings 18, each of which has an annular shoulder 19 adjacent to the lower surface and adapted to support a supply of container tops 20. The tops 20 preferably are constructed of foil having a thin film of plastic or other heat treatable material thereon.

In order to remove the tops one at a time, an air header 21 is located below the platform 17 and is connected to a source of negative pressure or partial vacuum (not shown). A plurality of nipples 22 extend upwardly from the air header 21 generally at right angles thereto, and each of such nipples is connected to a suction cup 23 located in a position to engage the lowermost top 20. The air header 21 is carried by a mounting block 24 at each side and such mounting block is fixed to an upstanding shaft 25 slidably received in a bushing 36 carried by the platform 17.

The shaft 25 is adapted to be raised and lowered intermittently in any desired manner as by the use of a bell crank linkage operated by a cam mechanism (not shown). In the upper position the suction cups 23 engage the lowermost top 20 and such engagement opens an air valve to apply a suction to such top. After the top has been connected by the vacuum to the suction cup, the shaft 25 is moved downwardly which downward movement carries the air header with it and removes the lowermost top from the stack.

It is necessary that the suction cups be rotated substantially 180 degrees, and in order to cause this rotation one end of the air header 21 extends through a floating block 27 and the end of such header is provided with a roller 28. The header 21 projects through a slot 29 in the floating block 27, and such block is slidably mounted on a pin or roller 30 carried by a projection 31 of a cam lever 32. The upper end of the cam lever 32 is pivotally connected by a pin 33 to one of the side members 16 and the free end of such cam lever is urged in one direction by a spring 34. The roller 28 is in engagement with the cam surface of th lever 32 and as the shaft 25 is moved downwardly the roller 28 will follow the cam surface of the lever while the suction cups are being retracted from the platform 17.

After the suction cups and the tops 20 carried thereby have been retracted from the platform the roller 28 will engage the projection 31 and cause the floating block 27 to pivot about the pin 30 until the header has rotated substantially 180 degrees and the suction cups are disposed in a downward position as illustrated in FIG. 7 with the top place on the cup 13. In this position the vacuum within these suction cups will be interrupted and the suction cups will release the tops and return to their uppermost position.

In order to seal the tops 20 to the cups 13 an actuator arm 38 is connected to the mounting block 24 by means of a top plate 39. The actuator arm 38 carries a roller support block 40 on its lower surface and such block rotatably supports a roller 41.

On the frame 10 beneath the actuator arm 38 is located an adjustable base plate 42 at each side of the frame 10 and each of such base plates is provided with a pillow block 43 which rotatably receives a shaft 44. At one side of the machine a rocker arm 45 is fixed to the shaft 44, and one end of such rocker arm is urged downwardly into engagement with a stop 45.

Spaced along the shaft 44 substantially in alignment with the suction cups 23 are a plurality of cartridge support arms 48 rotatably mounted thereon and each of such arms is provided with an arcuate slot 49 in which a stop pin 50 is located. The pin 50 and slot 49 permit limited swinging motion of the arm 48. A collar 51 is mounted on the shaft 44 and provides a bearing surface for one side of the arms 48 while a collar 52 is located on the other side of each support arm and spaced therefrom a short distance. A torsion spring 53 is connected at one end to the support arms 48 and at the other end to the collar 52 and is disposed about the shaft 44 between the support arms and the collar 52. The torsion spring normally urges the arcuate slot 49 against the stop pin 50. A cartridge plate 54 is supplied for each of the support arms 48 and one end of such cartridge plate is connected to the arm in any desired manner as by fasteners 55. The opposite end of each of the cartridge plates 54 removably receives a cartridge 56 of a high resistance material connected by electrical conduits 57 and 58 to a buss bar 59. The buss bar is carried by a buss bar support arm 60 fixed to the shaft 44 and supplied with electrical energy from any desired source (not shown).

In the operation of the device, the flights 11 are operated intermittently to advance a plurality of cups or containers to a cup filling station where a predetermined quantity of material is discharged into each container. Thereafter, the flights move the containers to a position below the lid dispensing mechanism 15 where the flights will temporarily halt. In this position the air header 21 will apply a suction to the suction cups 23 to attach the lowermost top of each stack to the suction cups. The shaft 25 then will be lowered so that the suction cups will be withdrawn from the platform 17 with a top still attached to each cup. As the shaft is lowered the roller 28 will engage the projection 31 of the cam lever 32 and cause the air header to be rotated substantially 180 degrees so that when the shaft reaches its lowermost position a top will be placed on each of the containers. During the last portion of the travel of the shaft 25 the roller 41 fixed to the mounting block 24 will engage one end of the rocker arm 45 and cause rotation of the shaft 44 which in turn will move the cartridges 56 into engagement with the tops 20. Due to the slots 49 and the torsion spring 53 the shaft 44 can be rotated to a point beyond the contact point of the cartridges so that during spot sealing the cartridges will be under spring tension only. The heat from the cartridges will cause the plastic of the top to be fused to the plastic film of the containers in the area of the cartridges. After a short time interval the shaft 25 again will be raised by its mechanism so that the cartridges 56 will be raised by its mechanism so that the cartridges 56 and the suction cups 23 will return to their initial positions after which the flights are advanced to the next step.

While a preferred embodiment in accordance with the present invention has been illustrated and described, it is understood that various modifications may be resorted to without departing from the spirit and the scope of the appended claims.

What is claimed is:

1. A spot sealer for sealing a top to a container in one spot comprising a frame, a shaft rotatably carried by said frame, a plurality of cartridge support arms mounted on said shaft in spaced relation to each other, a cartridge carried by each of said support arms, buss bar means carried by said shaft, means electrically connecting said cartridge to said buss bar means, rocker arm means fixed to one end of said shaft, spring means urging said rocker arm means in one direction, a vertically movable actuator arm engageable with the opposite end of said rocker arm, and means for moving said actuator arm, whereby when said actuator arm engages said rocker arm the shaft will be partially rotated to cause said cartridges to engage the tops of the containers and spot seal the tops thereto.

2. The structure of claim 1 in which said cartridge support arms are swingably mounted on said shaft, stop pin means carried by said shaft for limiting the swing of said support arms, and spring means urging said support arms against said stop pins.

3. In a packaging machine having means for intermittently moving a plurality of containers therethrough, that improvement comprising the combination of lid dispensing and spot sealing mechanisms, said lid dispensing mechanism including an air header, a plurality of suction cup means carried by said air header, means for moving said air header in a generally vertical direction, means for supporting a plurality of stacks of container lids mounted above said air header, one of said stacks being in alignment with each of said suction cup means, means for applying a suction to said suction cups for connecting the lowermost lid thereto, means for rotating said air header substantially 180 degrees as the air header is moved downwardly so that one lid is placed on top of each container, said spot sealer mechanism including a rotatable shaft, a plurality of cartridge arms carried by said shaft, a rocker arm fixed to said shaft adjacent one end thereof, an actuator arm connected to said mechanism for moving said air header vertically, means on said actuator arm for engaging said rocker arm, a heatable cartridge carried by each of said cartridge arms and adapted to engage each of said lids to seal the lids to the containers when said air header is lowered.

4. A spot sealer for sealing a top to a container comprising a rotatable shaft, at least one cartridge arm operatively mounted on said shaft, a heat applying cartridge fixed to said arm, rocker arm means fixed to said shaft, spring means for urging said rocker arm means toward inactive position, a vertically movable actuator arm located above said rocker arm on one side of said shaft, and means for selectively moving said actuator arm in a generally vertical direction so that the actuator arm will engage the rocker arm and rotate the shaft until the cartridge is in engagement with the lid.

References Cited

UNITED STATES PATENTS

| 3,214,884 | 11/1965 | Langdon | 53—373 X |
| 3,293,823 | 12/1966 | Anderson | 53—282 X |
| 3,418,786 | 12/1968 | Christine et al. | 53—282 |

TRAVIS S. McGEHEE, Primary Examiner

U.S. Cl. X.R.

53—329